June 27, 1961 J. STARK, JR., ET AL 2,990,447

COLOR TELEVISION RECEIVER FINE TUNING INDICATION

Filed May 19, 1958 2 Sheets-Sheet 1

INVENTORS
JOHN STARK, JR. &
BY WENDELL E. LAVENDER

W. H. Sprague
ATTORNEY

COLOR TELEVISION RECEIVER FINE TUNING INDICATION

Filed May 19, 1958 2 Sheets-Sheet 2

INVENTORS
JOHN STARK, JR. &
WENDELL E. LAVENDER
BY
W. H. Sprague
ATTORNEY

United States Patent Office 2,990,447

Patented June 27, 1961

2,990,447

COLOR TELEVISION RECEIVER FINE TUNING INDICATION

John Stark, Jr., Woodbury, and Wendell E. Lavender, Mount Ephraim, N.J., assignors to Radio Corporation of America, a corporation of Delaware Filed May 19, 1958, Ser. No. 736,326
15 Claims. (Cl. 178—5.4)

This invention relates generally to tuning indicators, and more particularly to fine tuning indication systems for color television receivers.

The accurate fine tuning adjustment of television receivers, while an art difficult for some viewers to master, is an important factor in determining the quality of the reproduced picture. This is particularly true of color television receivers which are operable to reproduce either monochrome or color television transmissions. It has been found that fine tuning control settings which permit acceptable monochrome reception may be so inaccurate that the receiver operation for succeeding color programs on the same channel are highly unsatisfactory, even to the extent that the color television signal may be reproduced as a monochrome image.

It is an object of this invention to provide an improved tuning indication system for color television receivers.

It is another object of this invention to provide an improved fine tuning indication system for color television receivers which enables rapid and accurate setting of the fine tuning control.

A further object of this invention is to provide an improved fine tuning indication circuit for color television receivers which is of simple construction, and which provides stable operation with only a small number of component parts.

In accordance with the invention a visual display on the screen of the kinescope provides an indication of the fine tuning error. The visual display comprises a pattern which is reproduced in different hues for different directions of mistuning of the receiver fine tuning control. When the receiver is properly tuned, the tuning indication pattern may be reproduced without color. The tuning indicator circuits for producing the display include a signal source which is coupled to the color demodulating circuits through a phase shifting or a phase switching circuit, the response of which is controlled as a function of the receiver fine tuning.

The novel features which are considered to be characteristic of this invention are set forth with particularity in the appended claims. The invention itself, however, both as to its organization and method of operation as well as additional objects and advantages thereof, will best be understood from the following description when read in connection with the accompanying drawings in which:

Figure 1:
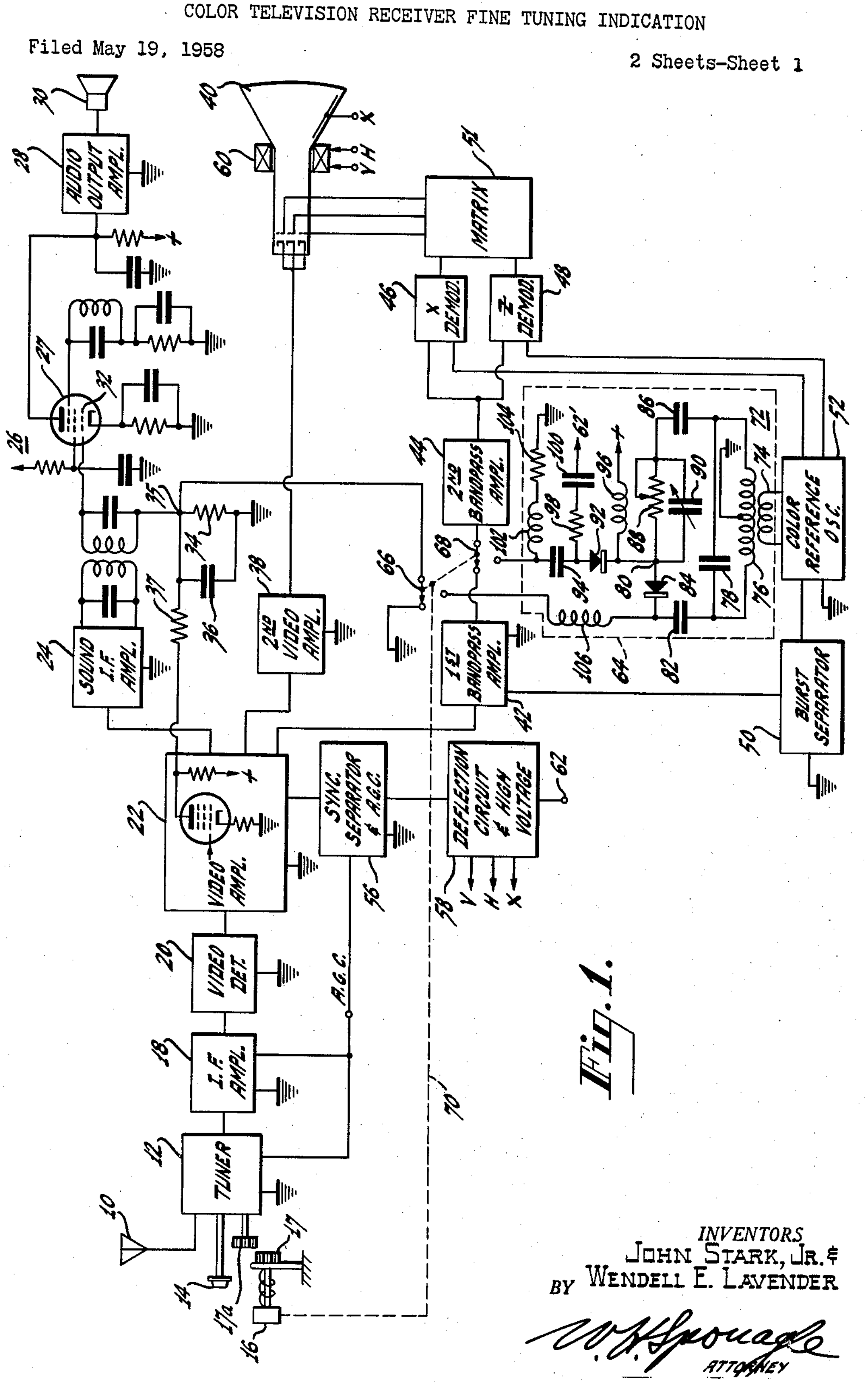
FIGURE 1 is a schematic circuit diagram, partly in block form, of a television receiver including a circuit for producing a tuning error indicating bar on the kinescope screen in accordance with the invention.

With reference to FIGURE 1, the television receiver is connected by a suitable transmission line to an antenna 10 which is responsive to signals in the television band. In accordance with present standards the transmitted television signals comprise a sound carrier and a picture carrier, the frequencies of which are 4.5 mcs. apart. Specifically, the antenna 10 is coupled to a tuner 12 which includes the usual tunable signal selection circuits for selecting any one of a plurality of transmitted television signals. The tuning of the signal selection circuits is controlled by a main tuning control knob 14.

As is conventional, the tuner 12 also includes a radio frequency (R.F.) amplifier, a signal mixer and oscillator (not shown). The oscillator produces a wave which is heterodyned with the selected television signal in the signal mixer to produce a corresponding signal of intermediate frequency (I.F.). By way of example, the picture and sound I.F. carrier frequencies may be at 45.75 and 41.25 megacycles (mcs.) respectively. To insure that the I.F. signals will be of the correct frequency, the tuning of the local oscillator may be controlled over a limited range by a tuning element (not shown), which is mechanically coupled to a fine tuning control knob 16.

As shown in FIGURE 1, the fine tuning knob 16 is ordinarily spring biased away from mechanical contact with the fine tuning element control shaft. Mechanical connection for fine tuning control is effected by moving the control knob 16 axially so that a gear 17 at the end of the control knob shaft meshes with a gear 17*a* mounted at the end of the fine tuning element shaft.

The resulting I.F. television signal is amplified in an intermediate frequency amplifier 18 and detected in a video detector 20 to derive the modulation components of the I.F. signal. The modulation components comprise a composite signal including video and synchronizing information as well as a 4.5 mcs. intercarrier sound signal for monochrome television signals, and in addition to those components a color television signal includes chrominance signal components and a color synchronizing burst signal. The detected signals from the video detector 20 are amplified in a first video amplifier 22 before application to other circuits in the receiver.

The 4.5 mcs. intercarrier sound signal which results from the heterodyning of the sound and picture I.F. carrier waves in the I.F. amplifier 18 is fed to a sound intermediate frequency amplifier 24. Amplified signals from the sound I.F. amplifier 24 are applied to a sound frequency modulation detector 26 which is shown as a quadrature grid or product type detector. The resultant audio signal derived from the output circuit of the detector 26 is fed to an audio power amplifier stage 28 prior to application to a loudspeaker 30.

The quadrature grid detector 26 includes a tube 27 which is designed to limit the signal at the input electrode 32 thereof under ordinary operating conditions. By providing a grid leak bias circuit for the detector tube 27 comprising a resistor 34 and a capacitor 36, the D.C. bias variation on the input electrode 32 is proportional to the amplitude of the input signal. Since the I.F. sound carrier is sharply attenuated in the circuits of the I.F. amplifier 18, any mistuning causes a relatively large amplitude change therein. Hence, the amplitude of the 4.5 mcs. intercarrier sound signal serves as a good indication of the local oscillator tuning.

Figure 2:
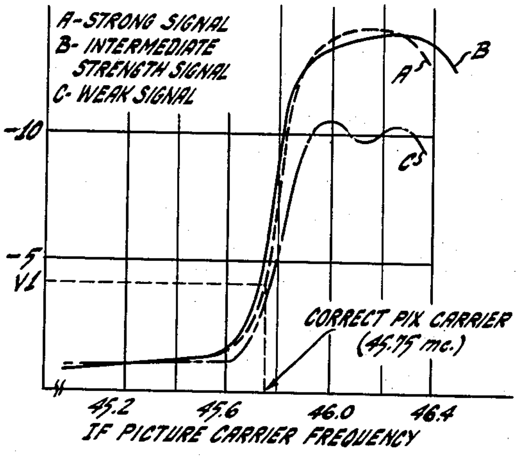
FIGURE 2 is a graph showing the relative voltage output at the receiver sound detector with changes in the tuning of the receiver local oscillator.

Some typical curves of the D.C. voltage changes which appear at a terminal 35 (across the resistor 34), as the oscillator tuning is varied are shown in FIGURE 2. It will be noted that the terminal 35 of FIGURE 1 is shorted to ground through the switch 66 except when the receiver is being fine tuned. It is desirable for fine tuning purposes that signal limiting in the sound I.F. amplifier 24 does not occur over the complete fine tuning range, otherwise the voltage variation across the resistor 34 will be reduced. As the oscillator is detuned from about 100 kcs. below, to about 100 kcs. above its proper operating frequency, the D.C. voltage rises with a steep slope from a very low value to a maximum value which is determined by the limiting characteristics of the preceding sound I.F. amplifier 24. For strong and intermediate strength signals at the antenna 10 (curves A and B in FIGURE 2), the curves do not change appreciably since the receiver AGC action tends to keep the signal level reasonably constant. With an input signal level insufficient to produce an acceptable picture, the peak value of the D.C. voltage is reduced but the characteristic rise of the curve still occurs approximately over the same frequency range (curve C of FIGURE 2).

Figure 3:
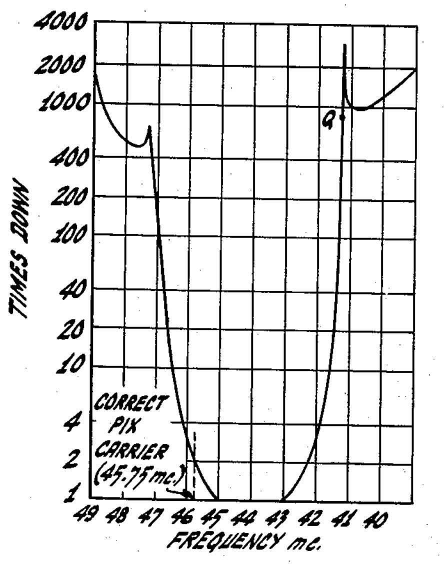
FIGURE 3 is a graph illustrating the overall frequency response of the intermediate frequency amplifier of the receiver shown in FIGURE 1.

The reason for the rapid change in amplitude of the 4.5 mcs. intercarrier sound signal over a narrow frequency range, and hence the variation of the D.C. voltage appearing at the terminal 35 of FIGURE 1 may be explained from the graph of FIGURE 3 which shows the frequency response characteristic of the intermediate frequency amplifier 18. It can be seen from FIGURE 3 that the response curve has a much steeper slope in the vicinity of the sound carrier (41.25 mcs.) than near the picture carrier (45.75 mcs.). Therefore, the amplitude of the I.F. sound carrier changes much more rapidly than the picture carrier as the oscillator is tuned through its correct frequency. Consequently, in this region, the amplitude of the 4.5 mcs. intercarrier sound signal is primarily determined by amplitude variations of the I.F. sound carrier (41.25 mcs.). Of course, as the oscillator is tuned far from its proper frequency, the amplitude variations of the picture carrier will start to affect the 4.5 mcs. signal amplitude appreciably, as shown by the eventual drop of the curves in FIGURE 2 for higher oscillator frequencies.

The curve of FIGURE 3 shows that the sound I.F. carrier is not disposed at the bottom of the "notch" in the I.F. amplifier 18 frequency response curve. This causes increased attenuation of the sound I.F. carrier as the local oscillator tuning is varied in one direction and decreased attenuation of the sound carrier as the oscillator tuning is varied in the other direction. Thus, the voltage at terminal 35 of FIGURE 1 of the sound detector is suitable for indicating the local oscillator tuning since it increases as the local oscillator is tuned in one direction from the correct setting, and decreases as the local oscillator is tuned in the other direction.

As can be seen by reference to FIGURE 2, the control voltage available at the sound detector grid varies slightly with signal strength. For a given setting of the fine tuning control knob 16 of FIGURE 1, a slight control voltage error is also produced by variations in line voltage, etc. To reduce these slight errors in the control voltage, a portion of the D.C. information at the anode of the video amplifier 22 is applied through a resistor 37 to the terminal 35. This error correction feature will be understood from a consideration of the following operational characteristics: FIGURE 2 shows that an increase in the oscillator frequency makes the control voltage more negative. Likewise increased line voltage causes increased signal amplification, and hence increased limiting at the sound detector grid thereby making the control voltage more negative. However, by the same token either increased line voltage or increased signal strength result in a larger signal being applied to the video amplifier 22. This results in an increased self bias on the video amplifier 22 which causes an increased or a more positive anode voltage. When the more positive video amplifier anode voltage is combined in the proper proportions with the more negative control voltage at the terminal 35, the above-mentioned errors in the control voltage may be substantially reduced.

The output signal from the video amplifier 22 is passed to a second video amplifier 38 which amplifies and provides a suitable delay to the luminance signal components prior to their application to color kinescope 40.

The chrominance signal components appearing in the output circuit of the video amplifier 22 are amplified in a first bandpass amplifier 42 which includes the necessary bandpass filter for separating the chrominance and color synchronizing burst components from the remainder of the composite video signal. The output signal from the first bandpass amplifier 42 is amplified in a second bandpass amplifier 44 before being fed to suitable demodulators designated as X and Z demodulators 46 and 48 respectively. The output signal from the first bandpass amplifier 42 is also fed to a conventional color synchronizing burst separator stage 50 which operates to separate the color synchronizing burst signal from the remainder of the chrominance signal. The separated color synchronizing burst is fed to a color reference oscillator 52 which includes circuits for maintaining the oscillator 52 in the proper phase relation with respect to that of the color synchronizing burst.

Suitable phases of the color reference oscillator signal are fed to the demodulators 46 and 48 to effect demodulation of the chrominance signals fed thereto from the bandpass amplifier 44. The demodulated signals are fed to a matrix 54 which operates to derive the necessary color difference signals for driving the color kinescope 40.

The signal output from the video amplifier 22 is also applied to the synchronizing signal separator and AGC stage 56 which operates to separate the horizontal and vertical synchronizing pulses from the composite video wave and to provide an AGC voltage for the R.F. and I.F. amplifiers. The separated synchronizing pulses are applied to the deflection and high voltage circuits 58. The circuits 58 develop suitable scanning waves for horizontal and vertical deflection. These scanning waves are available at the terminals designated H and V respectively for application to corresponding terminals at the deflection yoke 60. A voltage of suitable magnitude for application to the ultor electrode of the kinescope 40 is applied from the terminal X to the corresponding terminal of the ultor by connections not shown.

The deflection and high voltage circuits 58 also include a terminal 62 at which a keying pulse is produced which occurs during the interval of one of the horizontal or vertical scanning waves. As will be explained hereinafter, where the tuning indicator is to exhibit a horizontal tuning indicator bar, the pulse occurs at the field repetition rate; for a vertical tuning indicator bar the terminal 62 is connected such that the pulse appearing thereon is recurrent at the horizontal line rate. The keying pulse at the terminal 62 is applied through a conductor not shown to a terminal 62' in the tuning indicator circuit 64.

During the normal operation of the color television receiver, the fine tuning indicator circuit 64 is inactivated by the switches 66 and 68. However, as indicated by the dashed line 70, the switches 66 and 68 are ganged with the fine tuning control knob 16. When the fine tuning control knob is moved axially to fine tune the receiver, the switches 66 and 68 are operated from the positions shown, to the alternate positions. In the alternate positions, the switch 68 breaks the connection between the first and second bandpass amplifiers 42 and 44, and applies the output signal from the tuning indicator circuit 64 to the second bandpass amplifier 44. The switch 66 in its alternate position disconnects the terminal 35 from ground and applies the control voltage from the terminal 35 in the sound detector stage 26, which is indicative of the fine tuning of the local oscillator, to the tuning indicator circuit 64.

The tuning indicator circuit 64 which is essentially a phase switching circuit includes an input transformer 72 which has a primary winding 74 coupled to receive a signal from the color reference oscillator 52 and a secondary winding 76 with a grounded centertap. The secondary winding is tuned to the 3.58 mcs. color reference oscillator signal by a capacitor 78. Signals appearing at the end terminals of the secondary winding 76 are coupled through separate circuit paths to a common point 80. One of these circuit paths comprises a coupling capacitor 82 and a voltage responsive impedance element which is shown as a rectifier 84. The rectifier 84 is connected to the positive terminal of an operating potential supply source through an R.F. choke coil 96 to operate the rectifier 84 at the desired current level. As used herein the term voltage responsive impedance element also includes current responsive elements. The other circuit path comprises a coupling capacitor 86 in series with a parallel variable resistor 88-variable capacitor 90 combination.

Signals appearing at the point 80 are applied to rectifier 92 which is coupled through a coupling capacitor 94 to the input circuit of the second bandpass amplifier 44. The rectifier 92 which is normally blocked, is keyed by a pulse from the deflection circuits 58 which is applied through the terminals 62 and 62′ and a series resistor 98 and capacitor 100. In order to deliver the proper phase signal appearing at the point 80 to the bandpass amplifier 44, the coupling capacitor 94 is tuned by an inductor 102. The inductor 102 provides high impedance to the 3.58 mcs. color reference oscillator signals, but effectively shunts the lower frequency keying pulses to ground through the low resistance of the damping resistor 104. The control voltage indicative of the local oscillator tuning is applied to the rectifier 84 through the switch 66 and the R.F. choke coil 106.

In the operation of the circuit, when the local oscillator is properly tuned, the resistor 88 and the capacitor 90 are adjusted to balance out the equivalent impedance of the rectifier 84. At the condition of balance, the point 80 appears at the same potential as the center tap of the secondary winding 76 which is grounded. As the local oscillator is mistuned in one direction, the control voltage changes in a first polarity direction and effects a change in the impedance of the rectifier 84. This effectively moves the point 80 closer to the end of the secondary winding 76 to which the capacitor 82 is connected. Thus, signals appearing at the point 80 will be of the same phase as those fed through the capacitor 82.

As the local oscillator is mistuned in the opposite direction, the control voltage changes in the opposite direction, and likewise effects an opposite change in the impedance of the rectifier 84. This effectively moves the point 80 closer to the end of the secondary winding 76 to which the capacitor 86 is connected. Accordingly, the signal appearing at the point 80 under these conditions will be of the same phase as those fed through the capacitor 86, or 180° out-of-phase with those fed through the capacitor 82.

For a vertical tuning bar to appear on the screen of the kinescope 40, the rectifier 92 is keyed by pulses from the terminals 62 and 62′ which recur at the horizontal line rate. These pulses are of sufficient amplitude to overcome the reverse biasing of the rectifier 92, and permit the signals appearing at the point 80 to be passed to the second bandpass amplifier. If the keying pulses occur midway through the horizontal scanning trace, the tuning indicator bar will appear vertically in the middle of the screen of the kinescope 40.

For mistuning in one direction, the signals appearing at the point 80 are amplified by the second bandpass amplifier 44 and applied to the X and Z demodulators 46 and 48. This signal appears as an ordinary chrominance signal and is demodulated and applied to the kinescope 40 to cause the tuning indicator bar to appear as a first hue. For mistuning in the opposite direction, the signal appearing at the point 80 is of opposite phase, and accordingly, the output of the demodulators 46 and 48 will cause the tuning indicator bar to appear as a complementary hue. When the local oscillator is properly tuned, no signal appears at the point 80, and hence the tuning indicator bar appearing on the screen of the kinescope 40 is colorless.

If a horizontal tuning bar is desired, the rectifier 92 should be keyed at the vertical field rate, or a submultiple thereof.

Figure 4:
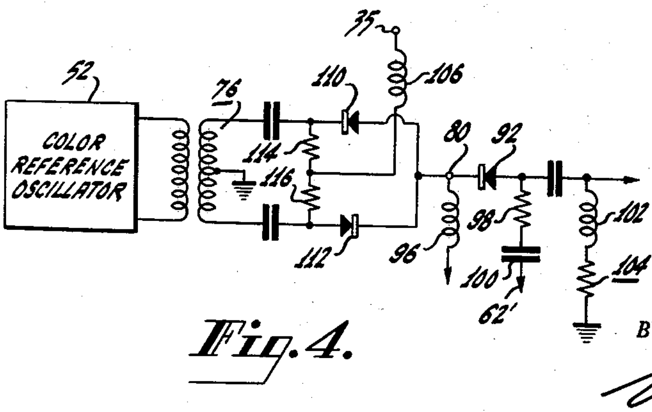
FIGURE 4 is a schematic circuit diagram of a modification of the tuning indicator circuit shown in FIGURE 1.

FIGURE 4 shows another embodiment of the invention wherein the unilateral conduction characteristics of rectifiers are used to derive the desired error signals. As shown in FIGURE 4, the opposite ends of the secondary winding 76 are coupled to the common point 80 through separate paths one of which includes a rectifier 110 and the other of which includes a rectifier 112. The D.C. control voltage indicative of local oscillator tuning is applied to the rectifiers 110 and 112 through the resistors 114 and 116 respectively. In the present case the net control voltage is positive due to the effect of the video amplifier anode connection. The reference bias applied through the inductor 96 is selected to be equal to the control voltage when the local oscillator is properly tuned. Under these circumstances, both rectifiers 110 and 112 conduct equally and no signal appears at the point 80. As the control voltage goes more negative due to mistuning in one direction, the rectifier 110 conducts more and rectifier 112 less so that the signals appearing at the point 80 are of the same phase as those appearing at the upper terminal of the secondary winding 76, 80. For a less negative control voltage, the rectifier 112 conducts more and rectifier 110 less so that signals appearing at the point 80 are of the same phase as those at the lower end of secondary winding. In other words, when the rectifier 110 is conducting more, the signals at point 80 are 180° out-of-phase with those at point 80 when the rectifier 112 is conducting more. Otherwise the operation of the circuit is substantially the same as that described in connection with FIGURE 1.

We claim:

1. In a color television receiver of the type including fine tuning control means and chrominance signal demodulating means for demodulating the chrominance signal component of a received color television signal; a fine tuning indicator circuit comprising means providing a source of signals having a frequency in the band of frequencies of said chrominance signal components, controllable phase shifting circuit means coupling said source of signals to said chrominance signal demodulating means for controlling the phase of said signals applied to said chrominance signal demodulating means, and means responsive to the setting of said fine tuning control means coupled to said phase shifting circuit means for controlling said phase shifting circuit means to change the phase of signals applied from said source to said chrominance signal demodulating means in accordance with the settings of said fine tuning control means.

2. In a color television receiver of the type including fine tuning control means adjustable to tune said receiver for the optimum translation of a received television signal, and chrominance signal demodulating means for demodulating the chrominance signal components of a color television signal; a fine tuning indicator circuit comprising, means providing a source of signals having a frequency in the band of frequencies of said chrominance signal components; controllable phase shifting circuit means coupling said source of signals to said chrominance signal demodulating means; and means connected with said phase shifting means which is responsive to adjustments of said fine tuning control means in one direction from the adjustment for optimum translation of a received television signal to control said phase shifting circuit means to apply one phase of signals from said source to said chrominance signal demodulating means, and responsive to adjustments of said fine tuning control means in the opposite direction from the adjustment for optimum translation of a received television signal to control said phase shifting circuit means to apply the opposite phase of signals from said source to said chrominance signal demodulating means.

3. A fine tuning indicator circuit as defined in claim 2 wherein said means responsive to adjustments of said fine tuning control means is operative to control said phase shifting circuit means to prevent transfer of signals from said source to said chrominance signal demodulating means when said fine tuning control means is adjusted to tune said receiver for the optimum translation of a received television signal.

4. In a color television receiver of the type including fine tuning control means and chrominance signal demodulating means for demodulating the chrominance signal component of a received color television signal, a fine tuning indicator circuit comprising means providing a source of signals having a frequency in the band of frequencies of said chrominance signal components, voltage responsive phase shifting circuit means coupling said source of signals to said chrominance signal demodulating means, means connected in said receiver for deriving a control voltage whose magnitude varies as a function of the tuning of said receiver by said fine tuning control means, and means for applying said control voltage to said voltage responsive phase shifting means to cause different phases of signals from said source to be applied to said chrominance signal demodulating means for different adjustments of said fine tuning control means.

5. In a color television receiver of the type including fine tuning control means adjustable to tune said receiver for the optimum translation of a received television signal, and chrominance signal demodulating means for demodulating the chrominance signal components of a color television signal, a fine tuning indicator circuit comprising means connected in said receiver for deriving a control voltage whose magnitude varies as a function of the tuning of said receiver by said fine tuning control means such that said control voltage increases with adjustments of said fine tuning control means in one direction thereof from the adjustment for optimum translation of a received television signal and decreases with adjustments of said fine tuning control means in the opposite direction from the adjustment for optimum translation of a received television signal, means providing a source of signals having a frequency in the band of frequencies of said chrominance signal components, voltage responsive phase shifting circuit means coupling said source of signals to said chrominance signal demodulating means and connected to said control voltage deriving means for applying one phase of signals from said source to said chrominance signal demodulating means in response to increases in said control voltage from that corresponding to the adjustment of said fine tuning control means for optimum translation of said received television signal, and for applying an opposite phase of signals from said source to said chrominance signal demodulating means in response to a decrease in said control voltage from that corresponding to the adjustment of said fine tuning control means for optimum translation of said received television signal.

6. In color television receivers of the type including fine tuning control means for conditioning said receiver to translate a received television signal, a deflection wave generator for producing scanning wave, a color reference oscillator and a color picture reproducing device, a tuning indication system comprising means connected in said receiver for deriving a control voltage whose magnitude varies as a function of the tuning of said fine tuning control means, a transformer having a primary winding coupled to receive signals from said color reference oscillator and a secondary winding having a center tap connected with a point of reference potential, an output terminal for said tuning indicator system, means providing a first signal coupling path including an impedance element from one terminal of said secondary winding to said output terminal, means providing a second signal coupling path including voltage responsive impedance means coupled between the opposite terminal of said secondary winding to said output terminal, means for applying said control voltage to said voltage responsive impedance means to cause different phases of signals from said color reference oscillator to be applied to said output terminal for different adjustments of said fine tuning control means, and gate circuit means connected between said output terminal and said color picture reproducing device, said gate circuit means connected to said deflection wave generator for passing signals from said output circuit during a portion of the interval of said scanning waves.

7. In a color television receiver of the type including fine tuning control means, a color reference oscillator for providing demodulating signal waves and chrominance signal demodulating means having a chrominance signal input circuit adapted to receive the chrominance signal components of a received color television signal and a demodulating signal input circuit connected with said color reference oscillator for receiving said demodulating signal waves, the phase of said demodulating signal being such as to effect demodulation of said chrominance signal components by said demodulating means; a fine tuning indicator circuit comprising controllable phase shifting circuit means coupling said color reference oscillator to said chrominance signal demodulating means chrominance signal input circuit, and means responsive to the setting of said fine tuning control means coupled to said phase shifting circuit means for controlling said phase shifting circuit means to apply different phases of signals from said color reference oscillator to said chrominance signal demodulating means for different settings of said fine tuning control means.

8. In a color television receiver of the type including fine tuning control means adjustable to tune said receiver for the optimum translation of a received television signal, a color reference oscillator for providing demodulating signal waves, and chrominance signal demodulating means having a chrominance signal input circuit connected to receive the chrominance signal components of a color television signal and a demodulating signal wave input circuit connected with said color reference oscillator for receiving said demodulating signal wave, the phase of said demodulating signal waves being such as to effect demodulation of said chrominance signal components by said demodulating means; a fine tuning indicator circuit comprising, a controllable phase shifting circuit means coupling said color reference oscillator to the chrominance signal input circuit of said chrominance signal demodulating means, and means connected with said phase shifting circuit means which is responsive to adjustments of said fine tuning control means in one direction from the adjustment for optimum translation of a received television signal for controlling said phase shifting circuit means to apply one phase of signals from said color reference oscillator to said chrominance signal demodulating means, and responsive to adjustments of said fine tuning control means in the opposite direction from the adjustment for optimum translation of a received television signal for controlling said phase shifting circuit means to apply the opposite phase of signals from said color reference oscillator to said chrominance signal demodulating means.

9. In a color television receiver of the type including manually adjustable fine tuning control means for tuning said receiver for the optimum translation of a received television signal, a color reference oscillator for providing demodulating signal waves, and chrominance signal demodulating means having a chrominance signal input circuit connected to receive the chrominance signal components of a color television signal and a demodulating signal wave input circuit connected with said color reference oscillator for receiving said demodulating signal wave, the phase of said demodulating signal waves being such as to effect demodulation of said chrominance signal components by said demodulating means; a fine tuning indicator circuit comprising means including a center-tapped impedance element coupled to said color reference oscillator for deriving signals having a frequency corresponding to that of said demodulating signal waves, said center tap being connected with a point of reference potential for said receiver, an output circuit for said tuning indicator circuit, means providing a first signal coupling path between one terminal of said impedance element and said output circuit, means providing a second signal coupling path including a voltage responsive impedance element between the other terminal of said impedance element and said output circuit, means connected in said receiver for deriving a control voltage whose magnitude varies as a function of the tuning of said receiver by said fine tuning control means, means for applying said control voltage to said voltage responsive impedance element to cause the different phases of signals from said source to be applied to said output circuit for different adjustments of said fine tuning control means, said second signal coupling path including means adjustable to provide substantially the same impedance as said first signal coupling path for a control voltage magnitude corresponding to the tuning of said receiver for optimum transfer of a received television signal, and normally open switch means connecting said output circuit to said chrominance signal demodulating means, said switch means mechanically coupled with said manually adjustable fine tuning control means and adapted to be actuated when said fine tuning control means is manually actuated.

10. A fine tuning indication system for color television receiver of the type including fine tuning control means adjustable to a proper setting for translating a received television signal through said receiver, chrominance signal demodulating means for demodulating the chrominance signal component of a received color television signal, and a color picture reproducing device, means for generating an indicating signal, means coupling said indicating signal generating means to said demodulating means and responsive to said fine tuning control means for controlling the phase of said indicating signal applied to said demodulating means such that an indicating pattern is reproduced in different colors by said color reproducing device as said fine tuning control means is tuned in opposite directions from said proper setting.

11. A fine tuning indication system for color television receiver of the type including fine tuning control means adjustable to a proper setting to tune said receiver for the optimum translation of a received television signal, and a color picture reproducing device, means for generating an indicating signal the electrical characteristics of which change as a function of the tuning of said receiver by said fine tuning control means, and means coupling said indicating signal generating means to said color picture reproducing device such that an indicating pattern is reproduced in different colors by said color reproducing device as said fine tuning control means is tuned in opposite directions from said proper setting.

12. In a color television receiver of the type including manually adjustable fine tuning control means for tuning said receiver for the optimum translation of a received television signal, a color reference oscillator for providing demodulating signal waves, chrominance signal demodulating means having a chrominance signal input circuit connected to receive the chrominance signal components of a color television signal and a demodulating signal wave input circuit connected with said color reference oscillator for receiving said demodulating signal wave, the phase of said demodulating signal waves being such as to effect demodulation of said chrominance signal components by said demodulating means and a deflection wave generator for producing a scanning wave; a fine tuning indicator circuit comprising means including a center-tapped impedance element coupled to said color reference oscillator for deriving signals having a frequency corresponding to that of said demodulating signal waves, said center tap being connected with a point of reference potential for said receiver, an output circuit for said tuning indicator circuit, means providing a first signal coupling path between one terminal of said impedance element and said output circuit, means providing a second signal coupling path including a voltage responsive impedance element between the other terminal of said impedance element and said output circuit, means connected in said receiver for deriving a control voltage whose magnitude varies as a function of the tuning of said receiver by said fine tuning control means, means for applying said control voltage to said voltage responsive impedance element to cause different phases of signals from said source to be applied to said output circuit for different adjustments of said fine tuning control means, said second signal coupling path including means adjustable to provide substantially the same impedance as said first signal coupling path for a control voltage magnitude corresponding to the tuning of said receiver for optimum transfer of a received television signal, a normally cut-off diode and a normally open switch connected in the order named between said output circuit and said chrominance signal demodulating means, said switch mechanically coupled with said manually adjustable fine tuning control means and adapted to be closed when said fine tuning control means is manually actuated, and means coupling said diode to said deflection wave generator to render said diode conductive during a portion of the interval of said scanning wave.

13. In a color television receiver of the type including fine tuning control means adjustable to tune said receiver for the optimum translation of a received television signal, a deflection wave generator for producing a scanning wave, a color reference oscillator for providing demodulating signal waves, and chrominance signal demodulating means having a chrominance signal input circuit connected to receive the chrominance signal components of a color television signal and a demodulating signal wave input circuit connected with said color reference oscillator for receiving said demodulating signal wave, the phase of said demodulating signal waves being such as to effect demodulation of said chrominance signal components by said demodulating means; a fine tuning indicator circuit comprising, controllable phase shifting circuit means having an input circuit coupled to said color reference oscillator and an output circuit, gate circuit means coupled between said output circuit and the chrominance signal input circuit of said chrominance signal demodulating means, means connected with said phase shifting circuit means which is responsive to adjustments of said fine tuning control means in one direction from the adjustment for optimum translation of a received television signal for controlling said phase shifting circuit means to apply one phase of signals from said color reference oscillator to said chrominance signal demodulating means, and responsive to adjustments of said fine tuning control means in the opposite direction from the adjustment for optimum translation of a received television signal for controlling said phase shifting circuit means to apply the opposite phase of signals from said color reference oscillator to said chrominance signal demodulating means, and means coupling said gate circuit means to said deflection wave generator for passing signals from said output circuit to said chrominance signal demodulating means during a portion of the interval of said scanning waves.

14. In a color television receiver of the type including fine tuning control means adjustable to tune said receiver for the optimum translation of a received television signal, a deflection wave generator for producing a scanning wave and chrominance signal demodulating means for demodulating the chrominance signal components of a color television signal, a fine tuning indicator circuit comprising means connected in said receiver for deriving a control voltage whose magnitude varies as a function of the tuning of said receiver by said fine tuning control means such that said control voltage increases with adjustments of said fine tuning control means in one direction thereof from the adjustment for optimum translation of a received television signal and decreases with adjustments of said fine tuning control means in the opposite direction from the adjustment for optimum translation of a received television signal, means providing a source of signals having a frequency in the band of frequencies of said chrominance signal components, normally closed gate circuit means connected to said deflection wave generator and responsive thereto to open during a portion of the interval of said scanning wave, voltage responsive phase shifting circuit means coupling said source of signals to said gate circuit means and connected to said control voltage deriving means for applying one phase of signals from said source to said gate circuit means in response to increases in said control voltage from that corresponding to the adjustment of said fine tuning control means for optimum translation of said received television signal, and for applying an opposite phase of signals from said source to said gate circuit means in response to a decrease in said control voltage from that corresponding to the adjustment of said fine tuning control means for optimum translation of said received television signal, and means for coupling said gate circuit means with said chrominance signal demodulating means.

15. In color television receivers of the type including fine tuning control means for conditioning said receiver to translate a received television signal, a deflection wave generator for producing scanning wave, a color reference oscillator and a color picture reproducing device, a tuning indication system comprising means connected in said receiver for deriving a control voltage whose magnitude varies as a function of the tuning of said fine tuning control means, a transformer having a primary winding coupled to receive signals from said color reference oscillator and a secondary winding having a center tap connected with a point of reference potential, an output terminal for said tuning indicator system, means providing a first signal coupling path from one terminal of said secondary winding to said output terminal, means providing a second signal coupling path including voltage responsive variable impedance diode coupled between the opposite terminal of said secondary winding to said output terminal, means for applying said control voltage to said voltage responsive variable impedance diode, and gate circuit means including a normally non-conductive diode coupled between said output terminal and said color picture reproducing device, means connecting said diode to said deflection wave generator to receive a signal therefrom to render said diode conductive for passing signals from said output circuit during a portion of the interval of said scanning waves.

References Cited in the file of this patent

UNITED STATES PATENTS

| | | |
|---|---|---|
| 2,180,944 | Linsell | Nov. 21, 1939 |
| 2,849,529 | Parker | Aug. 26, 1958 |